May 25, 1948.  R. R. SAMPSELL  2,442,248
BOAT TRAILER
Filed Dec. 8, 1947
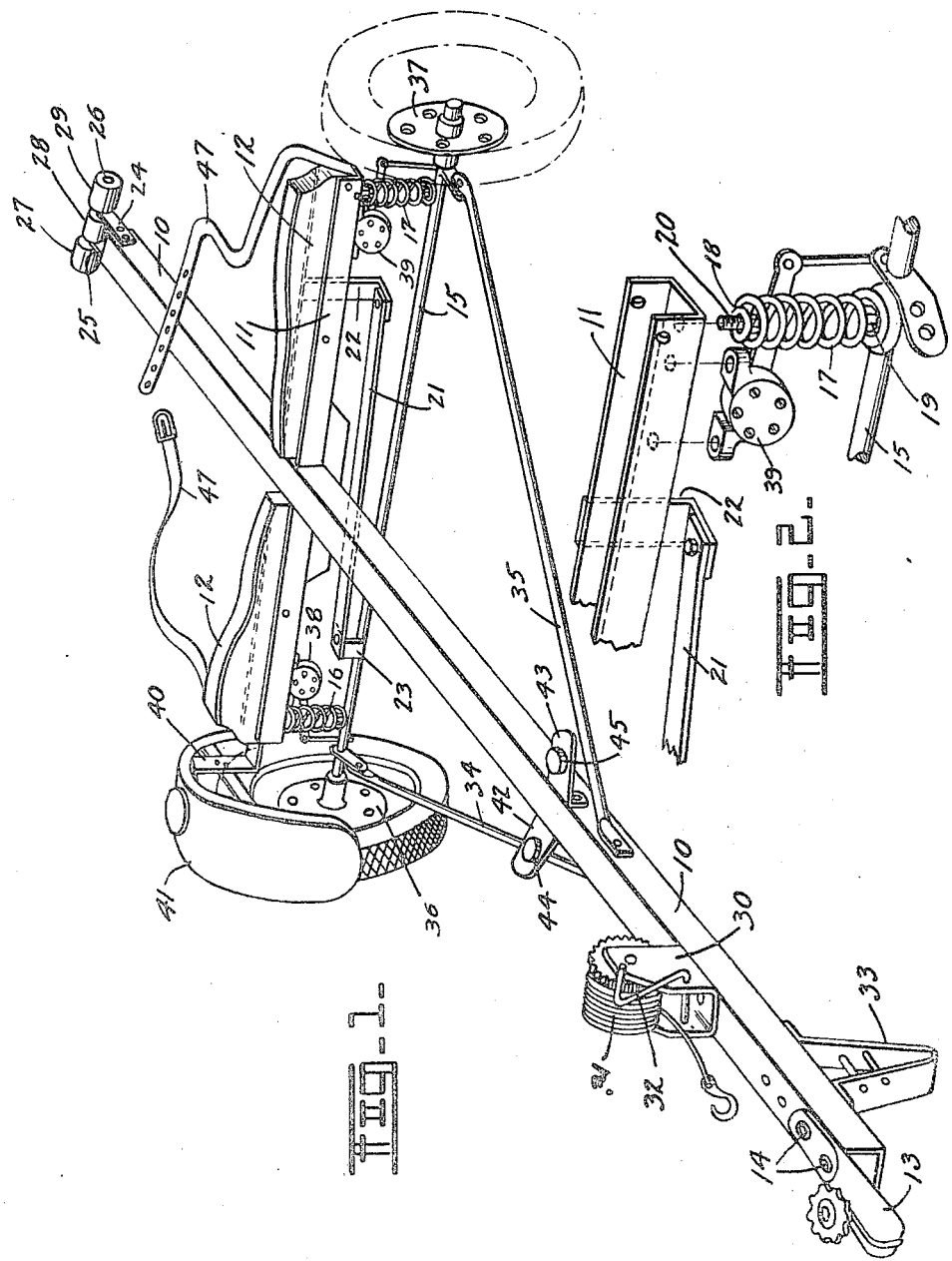
INVENTOR.
Ralph R. Sampsell.
BY W. B. Harpman
ATTORNEY.

Patented May 25, 1948

2,442,248

UNITED STATES PATENT OFFICE 2,442,248

BOAT TRAILER

Ralph R. Sampsell, Youngstown, Ohio

Application December 8, 1947, Serial No. 790,297

6 Claims. (Cl. 214—84)

1

This invention relates to trailers and more particularly to trailers for transporting boats.

The principal object of the invention is the provision of a boat trailer.

A further object of the invention is the provision of a boat trailer incorporating means for loading a boat thereon.

A still further object of the invention is the provison of a boat trailer incorporating improved spring suspension means.

A still further object of the invention is the provision of a boat trailer of simple, inexpensive manufacture forming a durable, efficient and easily handled boat trailer.

The boat trailer shown and described herein comprises an improvement over that shown in my Patents No. 2,219,401, issued October 29, 1940, and No. 2,374,383, issued April 24, 1945.

In the commercial production of the trailers illustrated in the aforementioned patents, certain changes in the construction thereof and certain additions thereto have been found desirable in perfecting the boat trailer structures disclosed therein and in achieving the objects of the present invention. For example, it has been determined that a single axle is advantageously employed in the trailer construction and particularly in connection with a resilient sway bar affixed to the single axle and cross member of the trailer frame.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention resides in the accompanying drawing, wherein—

Figure 1 is a perspective view of the boat trailer.

Figure 2 is an enlarged, expanded, fragmentary view of a portion of the trailer shown in Figure 1.

By referring to the drawings and Figure 1 in particular it will be seen that a trailer has been disclosed which comprises a T-shaped frame, a longitudinal member 10 of which is formed of a suitable structural shape such as a rectangular tube. It will be obvious that an I beam or U-shaped channel may be equally advantageously employed. The cross frame member 11 comprises an inverted channel space being provided between the upwardly extending arms

2 thereof for the positioning of a pair of opposed keel blocks 12, one of which is shown in Figure 1 of the drawings.

A trailer hitching device 13 is affixed to the front end of the longitudinal frame member 10 by means of suitable fasteners 14. An axle 15 is disposed beneath the transverse frame member 11 and spaced with respect thereto and maintained in spaced relation thereto by a pair of coil springs 16 and 17. By referring to Figure 2 of the drawings wherein the coil spring 17 is shown in enlarged detail, it will be observed that it is formed with eyelets 18 and 19 at its upper and lowermost ends, respectively, so that it may be bolted thereby directly to the transverse frame member 11 and to the axle 15. A bolt 20 is shown in position in the eyelet 18 for securing the spring 17 to the cross frame member 11.

In order that the axle 15 may be positioned in desired relation to the cross frame member 11, a combination sway bar and secondary spring 21 is connected between the cross frame member 11 and the axle 15. As shown in Figure 1 of the drawings, the resilient sway bar comprises a member comparable to a single leaf spring bolted or otherwise secured at its ends to the cross frame member 11 and the axle 15 through L-shaped brackets 22 and 23 affixed to the cross frame member and axle, respectively, and providing means for mounting the resilient sway bar 21. The movement of the axle 15 with respect to the cross frame member 11 is thereby controlled by the coil springs 16 and 17 and the resilient sway bar 21 as distortion of the latter member occurs when the axle 15 moves with respect to the cross frame member 11.

The rearmost end of the longitudinal frame member 10 is provided with a pair of extending brackets 24 and 25 which serve to position a shaft 26 transversely thereof and at a point beyond the end of the longitudinal frame member 10. Three rollers 27, 28 and 29 are positioned on the shaft 26 and secured thereto. The longitudinal frame member 10 carries near its foremost end a winch 30 having a flexible cable 31 wound thereon and a crank 32 forming means for winding up the flexible cable 31 on the winch 30. Also positioned on the forward end of the longitudinal frame 10 there is a downwardly depending support member 33 which is bolted or otherwise affixed directly to the longitudinal frame member 10 and serves to support the front end of the longitudinal frame member 10 with respect to a supporting surface when the same is not carried on a towing vehicle through the trailer hitch 13. Torque rods 34 and 35 are bolted to the longitudinal frame member 10 and extend outwardly forming a V shape, the ends of the arms of the V shape being connected to the axle 15. The axle 15 has a pair of wheels 36 and 37 mounted thereon and the wheel constructions include suitable bearing assemblies. Shock absorbers 38 and 39 are mounted on the underside of the cross frame member 11 and affixed to the axle 15 for assisting in controlling the movement of the axle 15 with respect to the cross frame 11. Fender supporting brackets 40 are provided one on each side of the cross frame member 11 and carry fenders 41.

A pair of oppositely disposed L-shaped brackets 42 and 43 are provided with rubber-like pads 44 and 45 and are affixed to the longitudinal frame member 10 and serve to support a boat positioned on the trailer. It will be observed that a boat may be easily positioned on the trailer herein disclosed by tipping the trailer up so that the rollers 27, 28 and 29 engage the front portion of the keel of the boat to be loaded and the flexible cable 31 attached to the boat and the winch 30 then operated by the crank 32 so as to pull the boat upon the trailer. It will be seen that the keel of the boat will slide along the upper surface of the frame member 10 until it is brought to a point adjacent the winch 30 and it will be obvious that in the event a longer boat is loaded, the winch 30 may be moved forwardly on the frame member 10, as desired.

In position on the longitudinal frame member 10, the boat rests on the keel blocks 12 which are preferably shaped to the configuration of the boat normally carried on a trailer and additional support is provided by the L-shaped brackets 42 and 43 heretofore described. A pair of boat securing strips 46 and 47 are attached to the outermost end of the cross frame member 11 and cooperate with the keel blocks 12 to provide a flexible and secure means of securing the boat to the trailer.

It will thus be seen that a simple and efficient boat trailer has been disclosed which is capable of supporting a boat in a manner suitable for conveying the same over various road surfaces, particularly in that the construction of the boat trailer is such that road shocks normally transmitted to the boat are absorbed by the spring and sway bar tensioning means employed. The side movement of the axle 15 with respect to the cross frame 11 is resisted by the resilient sway bar 21, some side movement being permitted in a slight degree by the flexibility of the metal of the sway bar. At the same time, the cross frame 11 is directly supported by the coil springs 16 and 17 and any bouncing action imparted thereby is counteracted by the shock absorbers 38 and 39. Additionally, vertical movement of the axle 15 with respect to the T shaped frame of the trailer is resisted by the resilient sway bar 21 and to a degree controlled thereby.

It will thus be seen that a desirable improvement over the boat trailer shown in my previously mentioned patent has been disclosed herein which meets the several objects of this invention.

Having thus described my invention, what I claim is:

1. In a trailer having a cross-like frame formed of a longitudinal and a cross member and means on said frame for supporting a boat thereon; an axle positioned transversely beneath the said cross-like frame and coil springs spacing the said cross-like frame with respect to the said axle and secondary spring means spacing said cross-like frame and said axle and comprising a resilient bar normally disposed at an inclination substantially in a vertical plane through the axle and secured at one of its ends to the said cross member and at the other of its ends to the said axle.

2. In a trailer having a cross-like frame formed of a longitudinal and a cross member and means on the said cross member for supporting a boat thereon; springs affixed to the outermost ends of the said cross member and depending therefrom, and an axle positioned transversely of the said trailer and spaced with respect to the cross member thereof by the said springs, and a combination sway bar and secondary spring affixed to the said cross member and to the said axle and extending diagonally therebetween, torque members affixed to the said axle and to the said longitudinal member and a flexible strip assembly affixed to the ends of the said cross member for securing a boat on the said trailer, and rollers positioned at the rearmost end of the said longitudinal member and a winch positioned adjacent the foremost end of the said longitudinal member for loading a boat on the said trailer.

3. In a trailer having a cross-like frame formed of a longitudinal and a cross member and means on said frame for supporting a boat thereon; an axle positioned transversely beneath the said cross-like frame and springs spacing the said cross-like frame with respect to the said axle, and secondary spring means spacing said cross-like frame and said axle and comprising a resilient bar normally disposed in a vertical plane through the axle and secured at one end to said cross member and secured at its other end to the said axle, together with a pair of torque members secured to the said axle and to the longitudinal frame member.

4. In a trailer having a cross frame formed of a longitudinal and a cross member and means on the said cross member for supporting a boat thereon; springs affixed to the outermost ends of the said cross member and depending therefrom, and an axle positioned transversely of said trailer and spaced with respect to the cross member thereof by said springs, and secondary spring means spacing said cross-like frame and said axle and comprising a resilient bar normally disposed at an inclination substantially in a vertical plane through the axle and secured at one of its ends to the said cross member and at the other of its ends to said axle and extending therebetween inwardly of the connections of the first mentioned springs with said cross member, and torque members affixed to said axle and to the said longitudinal member.

5. In a trailer having a frame including a cross member, an axle member positioned beneath said cross member, springs affixed to the axle member and to the said cross member spacing the cross member with respect to the axle member, and a transversely disposed combination sway bar and secondary spring secured adjacent one end thereof to one of said members and secured adjacent its other end to the other of said members.

6. In a trailer having a frame including a cross member, an axle positioned beneath said cross member, springs spacing the cross member with respect to the axle interposed between end portions of the cross member and end portions of the axle, and a transversely disposed combination sway bar and secondary spring secured adjacent one end thereof to said cross member and secured adjacent its other end to the axle, and extending therebetween inwardly of the first mentioned springs.

RALPH R. SAMPSELL.

REFERENCES CITED

The following references are of record in the file of this patent:

UNITED STATES PATENTS

| Number | Name | Date |
|---|---|---|
| 1,779,887 | Melanson | Oct. 28, 1930 |
| 1,881,408 | Le Moon | Oct. 4, 1932 |
| 2,211,083 | Smith | Aug. 13, 1940 |
| 2,219,401 | Sampsell | Oct. 29, 1940 |
| 2,360,748 | Whisler, Jr., et al. | Oct. 17, 1944 |
| 2,374,383 | Sampsell | Apr. 24, 1945 |
| 2,389,338 | Zorc, Jr. | Nov. 20, 1945 |